Feb. 21, 1933. C. S. KELLEY 1,898,546
SIGNAL CONTROLLING DEVICE
Filed May 8, 1931
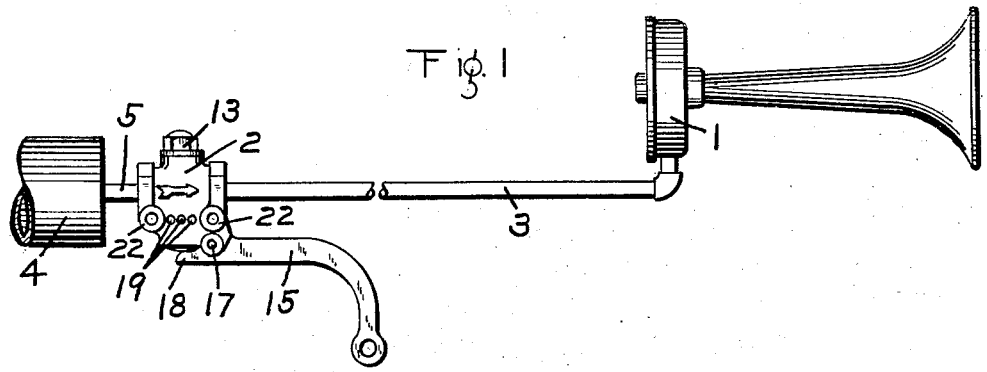
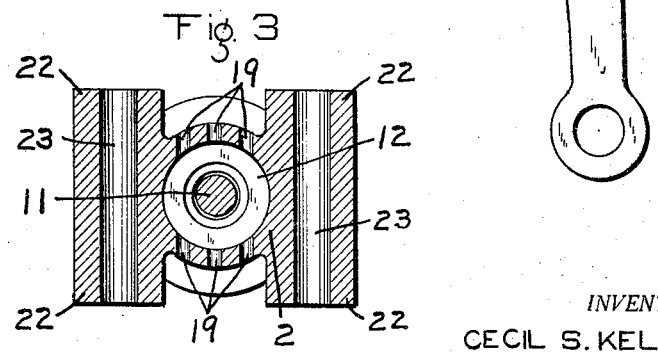
INVENTOR.
CECIL S. KELLEY
BY
Wm. M. Cady
ATTORNEY.

Patented Feb. 21, 1933

1,898,546

UNITED STATES PATENT OFFICE

CECIL S. KELLEY, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

SIGNAL CONTROLLING DEVICE

Application filed May 8, 1931. Serial No. 535,901.

This invention relates to pneumatic horn or signal devices, and more particularly to a manually operated valve device for controlling the supply of air for operating the signal device.

With the signal device so installed that a relatively long pipe is required to connect the controlling valve device with the signal device, the pipe acts as a reservoir and prevents the desired short snappy response of the signal device.

The principal object of my invention is to obviate the above difficulty by providing means associated with the controlling valve device for venting the pipe connecting the controlling valve device with the signal device, when the air supply valve of the controlling valve device is closed.

Other objects and advantages will be apparent in the following more detailed description of the invention.

In the accompanying drawing: Fig. 1 is a view of a pneumatic signal system embodying my invention; Fig. 2 a central sectional view of the controlling valve device employed in the system shown in Fig. 1; and Fig. 3 a section on the line 3—3 of Fig. 2.

As shown in Fig. 1, the signal system may comprise a pneumatic signal device 1, adapted to be operated by fluid under pressure to produce a signal, a manually operated controlling valve device 2 for controlling the supply of fluid under pressure, through pipe 3 to the signal device 1, and a reservoir 4, normally charged with fluid under pressure from which the valve device 2 supplies fluid under pressure to the signal device 1, the reservoir 4 being connected to the valve device 2 by pipe 5.

The valve device 2 comprises a valve casing having a chamber 6 open to pipe 5 and a chamber 7 open to pipe 3, said chambers being defined by a partition wall 8. The wall 8 is provided with a valve seat on which a valve 9 is adapted to seat, and extending in opposite directions from the valve 9 are stems 10 and 11.

The outer end of stem 10 extends into a guide bore 12' provided in a closure cap 13, which is screwed into the casing 2 and the outer end of stem 11 extends into a thimble 14, which is slidably mounted in a cylindrical bore provided in the casing 2. An operating lever 15 is pivotally mounted between lugs 16 carried by the casing, on a pin 17 and said lever is provided with a finger 18 adapted to engage the convex end of the thimble 14.

Openings 19 connect the bore 12 with the atmosphere, and the thimble 14 is provided with an annular seat rib 20 adapted to engage an annular gasket ring 21, when the thimble is moved upwardly.

The casing 2 is provided with bosses 22 having bores 23 for receiving bolts (not shown) by which the casing may be secured to a suitable support (not shown).

In operation, when it is desired to operate the signal device 1 to sound a signal, the lever 15 of the controlling valve device is rocked, so that the finger 18 operates to move the thimble 14 inwardly, until the rib 20 engages the gasket 21.

The stem 11 is thus operated to unseat the valve 9, permitting fluid under pressure to flow from the reservoir 4, through pipe 3 to the signal device 1. The seating of the thimble 14 on the gasket 21, prevents loss of fluid under pressure while the valve 9 is unseated. When the lever 15 is released, the spring 24, acting on valve 9, shifts the valve to its seat, so as to cut off the further supply of fluid from the reservoir 4 and at the same time, the outward movement of the thimble 14 causes the seat rib 20 to move away from the gasket 21, so that fluid in the chamber 7 and pipe 3 is vented to the atmosphere by flow around the stem 11 to chamber 12 and to the atmosphere by way of the openings 19.

Fluid under pressure is therefore not bottled up in pipe 3, when the valve 9 is seated, so that the signal device 1 quickly responds to the venting of fluid from pipe 3 and thus permits of a short, snappy response of the signal device.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:

The combination with a pneumatically operated signal device and a source of fluid under pressure, of a manually operated valve device comprising a casing, a valve in said casing for controlling the supply of fluid under pressure from said source to said signal device, a pipe through which said valve supplies fluid to said signal device, a stem carried by said valve, a thimble mounted on said stem and controlling a vent from said pipe, and a lever for operating said thimble to unseat said valve and close the vent from said pipe.

In testimony whereof I have hereunto set my hand, this 6th day of May, 1931.

CECIL S. KELLEY.